United States Patent [19]
Cogswell

[11] 3,980,744
[45] Sept. 14, 1976

[54] EXTRUSION OF HOLLOW ARTICLES THROUGH A LUBRICATED DIE

[75] Inventor: Frederic Neil Cogswell, Welwyn Garden City, England

[73] Assignee: Imperial Chemical Industries Limited, London, England

[22] Filed: Oct. 8, 1974

[21] Appl. No.: 513,177

[30] Foreign Application Priority Data
Oct. 26, 1973    United Kingdom............. 49896/73

[52] U.S. Cl.................................... 264/96; 264/98; 264/99; 264/173; 264/209; 264/327; 425/133.1; 425/326 B

[51] Int. Cl.²......................................... B29C 17/07

[58] Field of Search............. 264/95, 96, 210 R, 94, 264/98, 209, 99, 173, 329; 425/133.1, 326 B, 378, DIG. 206, DIG. 207

[56] References Cited
UNITED STATES PATENTS

| | | | |
|---|---|---|---|
| 2,317,687 | 4/1943 | Larchar | 264/209 |
| 2,902,716 | 9/1959 | Colombo | 425/378 |
| 3,082,484 | 3/1963 | Sherman | 264/98 |
| 3,223,761 | 12/1965 | Raley | 264/172 |
| 3,397,101 | 8/1968 | Rausing | 156/229 |
| 3,457,337 | 7/1969 | Turner | 264/98 |
| 3,635,624 | 1/1972 | Nakakoshi | 425/133.1 |

*Primary Examiner*—Jeffery R. Thurlow
*Attorney, Agent, or Firm*—Cushman, Darby & Cushman

[57] ABSTRACT

A method for producing hollow articles comprises extruding a thermoplastic material, initially in a molten state, through a lubricated die having a mandrel for constraining the material into a tubular shape, cooling the outer surface of the material during its passage through the die so that said material emerges therefrom as a tubular extrudate having its inner surface molten and its outer surface at a temperature below its freezing temperature, squeezing the extrudate at suitable intervals to fuse the molten inner surface together and thereby seal discrete lengths, and inflating the sealed lengths to conform to a surrounding mould to produce a shaped article.

5 Claims, 1 Drawing Figure

U.S. Patent  Sept. 14, 1976  3,980,744
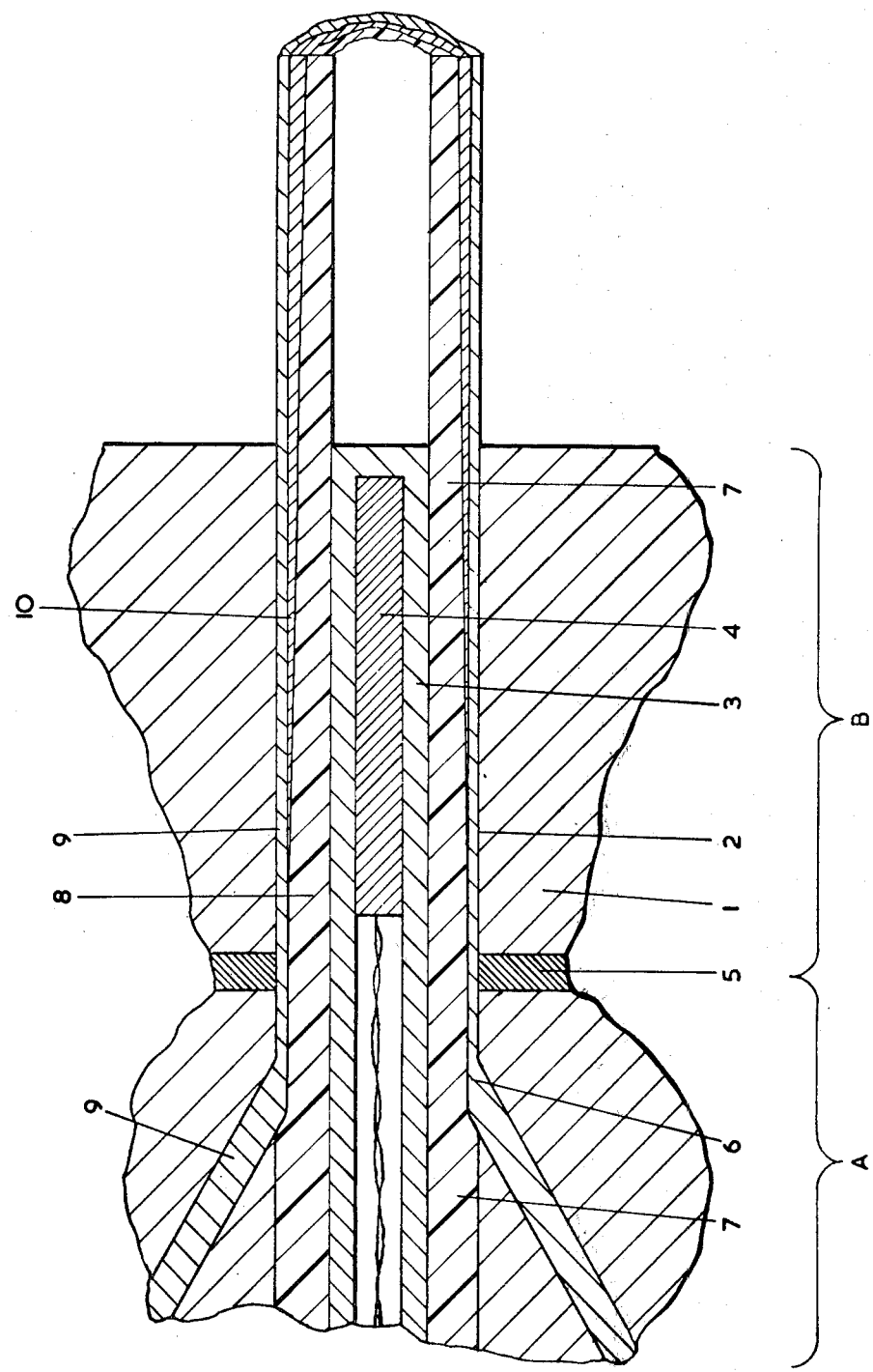

EXTRUSION OF HOLLOW ARTICLES THROUGH A LUBRICATED DIE

The invention relates to a method for producing hollow articles by blow moulding.

In the production of hollow articles by blow moulding, a known technique comprises extruding a tubular parison, sealing the parison at suitable intervals by squeezing together the molten sides of the parison so that they fuse, and inflating the sealed length of the parison in a surrounding mould to form the article. Because the sides of the parison must be sufficiently molten to fuse together, the parison tends to distort under its own weight as it leaves the extruder. For example, a vertically extruded parison tends to become elongated, and progressively thinner in its upper, i.e. later extruded, parts.

This distortion is particularly noticeable in the production of large mouldings where later-extruded thermoplastic melt may have to support a considerable weight of extrudate, and where extrusion from a screw extruder may be sufficiently slow for the weight of the extrudate to have to be supported for an undue length of time. To reduce this distortion, large parisons are commonly made using two stage machines having a screw stage into an accumulator, followed by a ram extrusion stage, so as to enable the extrusion of the parison to be effected rapidly. A further remedy is to extrude the parisons from melts of very high viscosity, although these are not even available for some materials such as nylon. However, the two stage machines and the use of very highly viscous materials lead to high machine costs, high processing energy requirements, and higher material costs as the cost of the special very high-viscosity materials is generally higher than that of the common, low-viscosity injection moulding grades of the same material. An alternative way of overcoming these problems has been to employ a sizing die, using trapped gas to inflate the extrudate against the die surface. However in order to enable the articles to be blow-moulded while sealing in the inflating gas, complicated and expensive haul-off equipment has to be employed.

According to the present invention, a method for producing hollow articles comprises extruding a thermoplastic material, initially in a molten state, through a lubricated die having a mandrel for constraining the material into a tubular shape, cooling the outer surface of the material during its passage through the die so that said material emerges therefrom as a tubular extrudate having its inner surface molten and its outer surface at a temperature below its freezing temperature, squeezing the extrudate at suitable intervals to fuse the molten inner surface together and thereby seal discrete lengths, and inflating the sealed lengths to conform to a surrounding mould, to produce a shaped article.

Thermoplastic polymeric materials normally exist in one of three recognisable states dependent on the temperature. At low temperatures they become rigid solids and are mechanically useful. At higher temperatures they become liquids which will flow, and in this state they may be injection moulded, for example. In between these two states is the third state in which the material is rubbery in texture, and it is in this state for example that sheets of the material may be vacuum formed. When a material in its molten state is cooled below its freezing temperature it passes into its rubbery state, in which it is more resistant to deformation than when in its molten state however viscous its molten state may be. Hence when the outer layer of the extrudate is cooled below its freezing temperature, it becomes more resistant to deformation even when having to support the weight of a considerable length of extruded material; but by maintaining the inner surface of the extrudate molten in the present process, the ends of the parison may still be sealed by squeezing the sides together.

Certain thermoplastic materials like polyolefins, polyamides and polyethylene terephthalate may become partially crystalline when cooled into their rubbery state, and even a small degree of crystallinity may be sufficient to significantly strengthen the material. Other materials such as commercial polymethyl methacrylate, polystyrene, and acrylonitrile/styrene copolymers have viscosities which are very sensitive to temperature, and although no crystallisation takes place, at around 140° to 160°C the material becomes so viscous that it takes on the appearance of a rubbery solid. Other materials such as polycarbonates and polysulphones behave similarly, but at higher temperatures in the region of 200°C.

Although most materials have a specific melting point or range below which they will freeze if they are held for an indefinitely long time, some may supercool to a freezing temperature lower than the melting point before solidification occurs if they are cooled rapidly. However, if the material is under stress as it is cooled, this may induce it to crystallise at a higher temperature than if the stress were not present. In general processing situations, both high stress and rapid cooling may be present. Thus the freezing temperature is a temperature which depends on the prevailing conditions and the length of time they are applied.

The amount of cooling required to avoid any significant distortion of the parison is dependent on the thermoplastic material used, on the design of the die, on the actual reduction in temperature and on the cooling period. Furthermore the amount of cooling permitted in any specific application is dependent on the requirements of the subsequent blow moulding step. At one end of the scale a minimal amount of cooling produces a minimal amount of distortion-resistance, and at the other end, if the parison is sufficiently thick walled and is cooled to a sufficiently low temperature for a sufficient length of time (i.e. to freeze a sufficiently thick layer), it is possible to produce an extrudate which is too rigid to be moulded. This latter condition is outside the scope of this invention because of the inability to complete the final steps. However, although the optimum extrusion conditions for any specific application cannot herein be specified on account of their being determined by the particular application and the actual apparatus used, the optimum degree of cooling is very readily determinable by simple trial, involving cooling the extrudate to just below its freezing temperature and increasing the cooling e.g. by lower die temperature or longer residence time, until the distortion-resistance is optimum in view of all the requirements of the specific application. Examples of suitable conditions for a range of thermoplastic materials are provided hereinafter as illustrations.

When molten polymeric material is cooled and solidified against the surface of a die, it tends to stick to it unless the die surface is adequately lubricated. A preferred method of lubricating the die comprises coextruding between the die and the surface of the polymeric material being cooled, a liquid having a freezing temperature lower than the freezing temperature of the thermoplastic material, the liquid emerging from the die at a temperature above its freezing temperature, whereby the liquid provides the die with its lubrication. The liquid not only provides effective lubrication between the freezing thermoplastic material and the die, but also generally provides a good thermal contact between the frozen extrudate and the surface of the die. This in turn enables conveniently short dies to be used. For stability during extrusion it is preferred that the viscosity of the liquid lubricant be greater than the viscosity of the thermoplastic material prior to the freezing of the latter, (despite its melting point being lower). Where the lubricant is of lower viscosity than the thermoplastic melt, there may be a tendency for the main stream of thermoplastic melt to penetrate the feed for the lubricant, although this does not altogether preclude the use of a lower viscosity lubricant. Furthermore, use of very low viscosity lubricants is likely to produce problems in preventing leakage in the feed lines.

If desired, the lubricating liquid may itself be a second polymeric material which remains liquid while within the die and which hardens on leaving the die supported as a film on the hardened layer of the thermoplastic material. Such a film can provide a special surface, e.g. one which is glossy, antistatic, pigmented or printable. For example, a polypropylene container may be produced with a lower melting ethylene/vinyl acetate copolymer coating, the die being maintained during extrusion at a temperature between the freezing temperature of the main feed of polypropylene (about 120°C) and the melting point of the secondary lubricating feed of ethylene/vinyl acetate copolymer (about 80°C). The secondary feed may generally be much less than the main feed so long as there is sufficient liquid to provide a continuous lubricating layer. This generality, however, does not preclude the use of a thicker secondary feed where this is required for a specific purpose in the final article.

Laminated parisons may be formed by coextruding two or more compatible compositions as the thermoplastic material, "compatible" implying that they adhere together when the laminate is cooled. The choice of compositions used will generally depend on the combination of physical and/or chemical properties desired for the article. However, the use of two different thermoplastic compositions may also be useful where it is desirable to have a cooled mandrel either to remove as much heat as possible from the material before it leaves the die or to cool the entire outer thermoplastic composition (i.e. the layer of thermoplastic compositions separated from the surrounding die by lubricant and from the mandrel by other thermoplastic compositions in liquid state) below its freezing point. In both of these cases, the inner layer must have a sufficiently low freezing point to perform both the task of providing a lubricant between the solidifying outer layer and the cool mandrel, and that of fusing the sides together to seal the discrete lengths of the parison.

In addition to its useful function of shaping the hollow core of the tubular extrudate, in the present method an important function of the mandrel is to control the temperature of the inner surface of the material as it passes through the die. It is generally preferred to maintain the mandrel at a temperature above the freezing point of the adjacent thermoplastic material by heating means located within the mandrel. This has been found to provide greater stability of the conditions during extrusion and suitably adjusted it also enables the extruder to be stopped while the thermoplastic material remains in the extruder, without the material freezing right through and blocking the extruder.

During extrusion, although the energy requirements for extrusion with cooling according to the invention are greater than without cooling for the same material, they can be considerably less than those for the extrusion of parisons in which an equivalent amount of support is obtained by the use of very high viscosity melts. Moreover, because the common low-viscosity injection moulding grades of polymers can have an outer layer cooled by the present method into a rubbery state which is sufficiently strong to support the weight of the parison, it is no longer essential to use very high viscosity polymers, and such expensive materials may be avoided. Further expenses in respect of capital equipment can also be avoided because the extrusion of the parison can now be effected in a single stage from a normal screw extruder; the addition of an accumulator and ram extruder being unnecessary when using the method of the present invention. The present method can also be operated without the haul-off equipment required when using an extrudate inflated into a sizing die, because the presence of the mandrel in the present process enables all the power for the extrusion to be obtained by applying the molten material under pressure to the inlet end of the die. Hence the expense and complications of such haul-off equipment may be avoided. Moreover by not requiring haul-off equipment for effective operation, apparatus for carrying out the present method of obtaining the parison may be attached as a self-contained unit to existing extrusion equipment, while usually requiring only the minimum of modification to that equipment.

Further advantages which can be obtained by suitably employing the present invention, include shorter cycle times since less heat needs to be lost during the moulding cycle due to the cooling during the extrusion stage. Better physical properties may be obtained in the final article by orientation which tends to occur in the direction of extrusion. Also by using a suitable lubricant layer which can be discarded after moulding, a mould of poor surface finish may be employed since fine imperfections tend to be lost in the thickness of the outer layer, and the surface of the underlying thermoplastic material remain glossy.

The present process is thus of particular utility in the formation of large hollow articles by blow-moulding techniques, and is especially suitable for use with polypropylene in enabling ordinary injection moulding grades to be used instead of the more expensive high-viscosity grades, polypropylene being a material whose mechanical properties make it particularly suitable for large mouldings. It is also of particular applicability to the formation of large mouldings from nylon which is not generally available in a high-viscosity grade, in that grades which are presently available (e.g. for injection moulding) may be used.

To illustrate the invention, a specific apparatus for accomplishing the present method will now be described by way of example, with reference to the accompanying drawing. The apparatus is a liquid-lubricated die for extruding parisons having an outer skin resistant to deformation, and the drawing is a schematic foreshortened section through the operative end of the die.

The apparatus comprises a die 1 having 30 mm diameter cylindrical inner surface 2 and a coaxial mandrel 3 having a diameter of 28 mm, giving a 1 mm annular gap between the mandrel and the die surface. Within the mandrel is a cartridge heater 4 and part way along the die is a short annular section of insulation 5 which divides the die into two zones A, B, having separate heat exchange systems (not shown) substantially isolated by the insulation 5. The length of zone B is about 5 cm. In zone A is an annular inlet 6 communicating with an axial annular passage 7 formed by the aforesaid gap. In use, molten thermoplastic material 8 is forced along the axial annular passage 7, and lubricant 9 is metered through the annular inlet 6 so as to separate the outer surface of the thermoplastic from the inner surface 2 of the die. Zone A is a hot zone in which the temperature of the die is substantially the temperature of the ingoing molten thermoplastic material, while zone B is cooled to below the freezing temperature of the material (but above the melting point of the lubricant), causing a stiff skin 10 to form around the otherwise still molten tubular extrudate. This is illustrated in the following Examples 1–12 which describe its use with specific materials in accordance with the present invention, while Example 13 provides a comparison. In all cases the Melt Flow Index (MFI) was measured according ASTM 1230 D 65 T, and in order to demonstrate the effectiveness of the present methods, the normal low viscosity injection moulding grades have been used througout.

EXAMPLE 1

The above apparatus was secured to the outlet from a conventional extruder (not shown). Polypropylene melt (MFI 230°C/2 kg = 3) was supplied by the extruder at 210°C, at a pressure sufficient to give a linear velocity of extrusion through the apparatus, of about 5 cm s$^{-1}$. Glycerine was used as lubricant, and this was metered into the apparatus via the annular inlet 6, at a rate of about 3% of the total volume flow. The mandrel was maintained by a 30 watt cartridge heater 4 at a temperature of 210 – 220 °C, and the surface 2 of the second zone B was cooled to −40°C. The outer surface of the tubular extrudate (which had an overall thickness of about 0.9 mm) froze to form a skin which from theoretical calculations would have been about 0.3 mm. The extrusion pressure required for this extrusion velocity under these conditions was about 7.5 × 10$^6$ N m$^{-2}$. Difficulty was experienced during extrusion in sealing the lubricant inlet 6 against ingression of the polypropylene melt, and in maintaining a continuous lubricant coating. To overcome these difficulties, the use of higher viscosity lubricants is preferred.

EXAMPLE 2

The same apparatus was used to form a parison of polypropylene with a particularly shiny coating, suitable variations being made to the conditions. Polypropylene melt (MFI 230°C/2kg = 3) at 210°C was forced along the axial passage 7 at the same pressure as before, and using the same mandrel temperature, but the glycerine was replaced by an ethylene/vinyl acetate (EVA) copolymer (28% by weight vinyl acetate, and MFI 190°C/2kg = 400) as lubricant. Because of the higher melting point of the copolymer lubricant, the cool zone B was reduced only to 100°C. From theoretical calculations, the thickness of the skin which was formed within the die under these conditions was only about 0.1 mm, on an overall thickness similar to that in Example 1. Unlike the glycerine lubricant of Example 1, however, which was of no further use after the extrudate emerged from the die (except for recycling as further lubricant), the copolymer which was coextruded as liquid lubricant hardened after leaving the die to form a further solid layer which imparted a glossy appearance on the extrudate.

EXAMPLE 3

Polypropylene homopolymer of MFI 230°C/2 kg = 12, was fed to the die as the main feed of thermoplastic material 8, and an EVA copolymer containing 28% vinyl acetate, MFI 190°C/2 kg = 5, was fed as the lubricant 9. The weight ratio of the polypropylene to lubricant was 88/12, and the total mass flow rate was 113 g min$^{-1}$ at 210°C, giving an average linear velocity through the dis of 2.8 cm s$^{-1}$. With the die cooled to about 100°C and the mandrel at about 210°C, the extrusion pressure was 12 × 10$^6$ N m$^{-2}$.

As the extrudate left the die it swelled visibly to 35 mm diameter and 1.6 mm thickness (c.f. die diameter 30 mm and gap 1 mm). The extrudate was found to be very resistant to distortion under its own weight, no sagging being detected in tubes 0.6 m long. (This may be contrasted with the result of Example 13). The linear velocity of the extrudate was about 1.5 cm s$^{-1}$, and it took 40 s to extrude the 0.6 m length.

0.6 m parisons extruded in this manner were subsequently sealed by squeezing the walls so that the molten inner layer fused, and then inflated with an inflation ratio of 2:1 to give a container 60 mm in diameter. The EVA copolymer layer was then stripped off portions of the bottle and the polypropylene examined for possible molecular orientation. Wide angle X-ray diffraction revealed that the inner layer which had been extruded at about 210°C has no significant orientation and besides the normal α form of polypropylene it also contained some β form (as described by a Turner-Jones, J. M. Aizlewood, and D. R. Beckett, in Die Mak Chem 75, 134, 1964). However a thin section cut from the surface of the outer layer was shown to be substantially oriented, the orientation lying mainly along the direction of extrusion. This was a higher degree of orientation that that usually found in polypropylene mouldings when using higher viscosity grades to combat sagging.

Polypropylene is a material which is mechanically very suited to the formation of large moulded articles. This Example (and likewise the relevant following Examples) illustrates how the present invention enables this material to be so readily moulded with such little additional equipment over that required for very small mouldings, especially when compared with that required for the previously used two stage process. It also demonstrates the comparatively low power requirements are the useful bonus of molecular orientation in the surface.

EXAMPLE 4

A bottle was formed in the manner described in the previous Example using the same materials and the same extrusion and blowing conditions. After moulding, the outer EVA layer was mechanically stripped from the polypropylene body leaving a particularly smooth surface. Imperfections in the surface texture of the mould were reproduced in the surface of the bottle to a much less extent than when a polypropylene parison was blown to form a bottle in direct contact with the mould surface.

EXAMPLE 5

The formation of a bottle as described in Example 3 was repeated except that the EVA copolymer lubricant was replaced by a low density polyethylene of MFI 190°C/2 kg = 7. The viscosity of this lubricant was still sufficient to give an even coating, and the resultant bottle had an appearance similar to that formed in Example 3.

EXAMPLE 6

In this Example, a lubricant having a higher viscosity was used. This was a repeat of the previous Example except that the lubricant was replaced by a low density polyethylene of MFI 190°C/2 kg = 2. Again a good bottle was successfully moulded with no apparent thinning of the later-extruded end.

EXAMPLE 7

A parison was extruded and a bottle blown from it under the conditions described in Example 3. The materials however were different, being polypropylene homopolymer of MFI 230°C/2 kg = 4.5 as the main feed of thermoplastic material, and as a secondary feed of lubricating material, an EVA copolymer having 28% vinyl acetate and an MFI 190°C/2 kg = 2.5. This combination of materials was equally successful in producing a uniform bottle under the conditions quoted.

EXAMPLE 8

The previous Example was repeated except that the homopolymer main feed thermoplastic material was replaced by a random polypropylene/ethylene copolymer, the copolymer having a 3% by weight ethylene content and a melt flow index 230°C/2 kg = 2.5. As before the bottle had walls of even cross section, and an even skin of the EVA copolymer.

EXAMPLE 9

High density polyethylene was used as the main feed in place of the polypropylene during a repeat of Example 3. EVA copolymer was again used as the lubricant with the die at 100°C, and the mandrel heated by the 30 watt heater. The high density polyethylene was fed to the die at 170°C, and the emerging tubular extrudate had good resistance to deformation under its own weight. The bottles moulded from this extrudate had a very similar appearance to those moulded in Example 3.

EXAMPLE 10

In this Example, the main feed thermoplastic material was a normal injection moulding grade of nylon 66, and this was fed to the die at 290°C. The die was the same as that of the previous examples except that the 30 watt heater was replaced by a 60 watt heater because of the higher freezing temperature of the thermoplastic material. The die was cooled to 250°C and to provide lubrication, a secondary feed of nylon 6 at 250°C was used. The extrusion and blow moulding operations were again successfully carried out to produce good bottles of even wall thickness. The two nylon layers were found to be tightly bonded together.

EXAMPLE 11

The process of Example 10 was repeated except that the nylon 6 of the secondary lubricant feed was replaced by polyethylene which was fed to the die at 150°C, the die also being maintained at 150°C. As before good bottles were produced, but the thin polyethylene layer was readily removable from the nylon 66 bottle.

Both this and the previous Example illustrate how the present invention enables large articles to be formed from nylon using blow moulding techniques, even though there are no nylon grades generally available which have sufficiently high melt viscosities to prevent undue distortion on normal blow moulding equipment.

EXAMPLE 12

Using the apparatus of Example 11 with the 60 watt heater, polycarbonate, as an example of an amorphous material, was fed to the die as the main feed of thermoplastic material, at a temperature 270°C. The lubricant used was polymethyl methacrylate and the die was maintained at 200°C. The bottles produced did not shown evidence of any sagging of the parison, and the polished mould surface was well reproduced in the glossy polymethyl methacrylate surface skin.

EXAMPLE 13

This is a comparative example which has been included to demonstrate the effectiveness of the cooling of the outer layer. The apparatus and materials of Example 3 were used but the die was not cooled (and hence this operation was outside the method of the present invention). The flow rate through the extruder was kept the same, but this entailed using a lower extrusion pressure of $9 \times 10^6$ N m$^{-2}$. The extrudate drew down under its own weight and at 0.6 m long, the cross-section had reduced to about one tenth of its initial area.

This is in sharp contrast to the result found in Example 3 using the cooling techniques of the present invention, in which no sagging under its own weight was apparent.

I claim:

1. A method for producing hollow articles which comprises extruding a thermoplastic polymeric material, initially in a molten state, through a die having a mandrel for constraining the material into a tubular shape and producing thereby a tubular extrudate having and outer surface and an inner surface; coextruding between the die and the outer surface of the polymeric material, a liquid having a freezing temperature lower than that of the polymeric material; cooling the liquid and the outer surface of the polymeric material during their passage through the die, to a temperature below the freezing temperature of the polymeric material but above the freezing temperature of the liquid, while maintaining the inner surface of the polymeric material molten, squeezing the extrudate at suitable intervals to fuse the molten inner surface together and thereby seal discrete lengths, and inflating the sealed lengths to conform to a surrounding mould to thereby produce the shaped article.

2. A method according to claim 1 in which the viscosity of the liquid is greater than the viscosity of the thermoplastic material prior to the freezing of the latter.

3. A method according to claim 1 in which the lubricating liquid is a polymeric material which remains liquid while within the die but which hardens on leaving the die to form a skin around the tubular extrudate of thermoplastic material.

4. A method according to claim 3 which comprises retaining the lubricant layer on the surface of the thermoplastic extrudate during moulding, and thereafter removing said layer from the moulded article.

5. A method according to claim 1 which comprises maintaining the temperature of the mandrel above the freezing temperature of the adjacent thermoplastic material by heating means located within the mandrel.

* * * * *